US012626291B2

(12) United States Patent
Vasiete Allas

(10) Patent No.: US 12,626,291 B2
(45) Date of Patent: May 12, 2026

(54) PERSONALIZED STOREFRONT FOR AN ONLINE CONCIERGE SYSTEM USING SEARCH-POWERED CAROUSELS

(71) Applicant: Maplebear Inc., San Francisco, CA (US)

(72) Inventor: Esther Vasiete Allas, Brooklyn, NY (US)

(73) Assignee: Maplebear Inc., San Francisco, CA (US)

( * ) Notice: Subject to any disclaimer, the term of this patent is extended or adjusted under 35 U.S.C. 154(b) by 281 days.

(21) Appl. No.: 18/158,219

(22) Filed: Jan. 23, 2023

(65) Prior Publication Data

US 2024/0249334 A1 Jul. 25, 2024

(51) Int. Cl.
*G06Q 30/00* (2023.01)
*G06Q 10/083* (2023.01)
*G06Q 10/087* (2023.01)
*G06Q 30/0601* (2023.01)

(52) U.S. Cl.
CPC ....... *G06Q 30/0631* (2013.01); *G06Q 10/083* (2013.01); *G06Q 10/087* (2013.01); *G06Q 30/0625* (2013.01); *G06Q 30/0633* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 7,403,910 B1 * | 7/2008 | Hastings | ................ | G06Q 30/02 705/347 |
| 8,103,675 B2 * | 1/2012 | Zhou | ......................... | G06N 5/02 706/46 |
| 8,572,509 B2 * | 10/2013 | Gobeil | ................ | G06F 9/44505 715/825 |
| 8,595,089 B1 * | 11/2013 | Roberts | .............. | G06Q 30/0631 705/347 |
| 11,818,227 B1 * | 11/2023 | Kumar | .................... | H04L 41/16 |
| 2001/0021914 A1 * | 9/2001 | Jacobi | .................... | G06Q 30/02 705/26.1 |
| 2008/0040329 A1 * | 2/2008 | Cussen | .................. | G06Q 30/02 |

(Continued)

OTHER PUBLICATIONS

Guy, Ido, et al. "Concierge: improving constrained search results by data melioration." Proceedings of the VLDB Endowment 13.12 (2020): 2865-2868. (Year: 2020).*

*Primary Examiner* — Christopher B Seibert
(74) *Attorney, Agent, or Firm* — Fenwick & West LLP

(57) ABSTRACT

An online concierge system generates a personalized storefront user interface to recommend items for purchase and delivery to a customer. The online concierge system obtains a user identifier for the customer and generates a set of recommended search terms that it predicts will be relevant to the customer. The recommended search terms may be identified at least in part by mapping items previously purchased by the customer to search queries that resulted in purchases of that item across a population of customers of the online concierge system. The online concierge system then executes respective search queries for the each of the set of search terms to generate respective search result sets for each of the recommended search terms. The search result sets may be presented as respective search queries on a user interface screen of a customer client device.

20 Claims, 4 Drawing Sheets

(56)　　　　References Cited

U.S. PATENT DOCUMENTS

| | | | | |
|---|---|---|---|---|
| 2008/0256478 A1* | 10/2008 | Bromley | ............ | G05B 19/0423 715/771 |
| 2009/0110089 A1* | 4/2009 | Green | .................. | H04L 5/0037 370/329 |
| 2010/0001892 A1* | 1/2010 | Aruga | ................. | H03M 1/1047 341/172 |
| 2010/0268661 A1* | 10/2010 | Levy | ..................... | G06Q 30/02 705/347 |
| 2011/0093486 A1* | 4/2011 | Lin | ..................... | G06F 16/2448 707/E17.05 |
| 2011/0106617 A1* | 5/2011 | Cooper | ............. | G06Q 30/0251 707/E17.014 |
| 2011/0307496 A1* | 12/2011 | Jones | ..................... | G06F 16/24 707/769 |
| 2012/0066275 A1* | 3/2012 | Gerstner | ................. | G06F 16/29 707/825 |
| 2012/0278725 A1* | 11/2012 | Gordon | ............... | H04N 21/858 715/738 |
| 2012/0290979 A1* | 11/2012 | Devecka | ........... | G06Q 30/0277 715/810 |
| 2013/0080319 A1* | 3/2013 | Greenstone | ........ | G06Q 30/0222 705/39 |
| 2013/0297324 A1* | 11/2013 | Phillips | .................. | G16H 40/20 705/2 |
| 2013/0297351 A1* | 11/2013 | Phillips | ................ | G06Q 10/103 705/4 |
| 2014/0180715 A1* | 6/2014 | Phillips | ................ | G06Q 10/103 705/2 |
| 2014/0250145 A1* | 9/2014 | Jones | .................. | G06F 16/3329 707/769 |
| 2015/0058174 A1* | 2/2015 | Dumon | ............. | G06Q 30/0631 705/26.64 |
| 2015/0127576 A1* | 5/2015 | Grol-Prokopczyk | ........................ | G06Q 30/0282 705/347 |
| 2015/0281435 A1* | 10/2015 | Charlson | ............. | H04M 3/5158 379/142.06 |
| 2016/0055245 A1* | 2/2016 | Hoarty | .................... | G06F 16/48 707/770 |
| 2017/0032052 A1* | 2/2017 | Raman | ................ | G06F 16/9024 |
| 2017/0235733 A1* | 8/2017 | Florance | ........... | G06F 16/24578 707/765 |
| 2017/0270212 A1* | 9/2017 | Lavrenko | ............... | G16B 20/20 |
| 2018/0013891 A1* | 1/2018 | Charlson | ........... | H04M 3/42059 |
| 2021/0287271 A1* | 9/2021 | Prasad | .................. | G06F 16/953 |
| 2022/0132290 A1* | 4/2022 | Kempel | ................ | H04L 67/306 |
| 2022/0182699 A1* | 6/2022 | Gordon | ................ | H04N 21/251 |

* cited by examiner

PERSONALIZED STOREFRONT FOR AN ONLINE CONCIERGE SYSTEM USING SEARCH-POWERED CAROUSELS

BACKGROUND

An online concierge system receives selections of items from customers, assigns orders to pickers to procure the items from physical retailers, and facilitates delivery of those items from the picker to the customer. In such a system, it is desirable to generate recommendations for items to assist the customer in efficiently generating orders.

SUMMARY

An online concierge system generates a personalized storefront user interface to recommend items for purchase and delivery to a customer. The online concierge system obtains a user identifier for a customer of an online concierge system. Based on the user identifier, the online concierge system obtains a set of recommended search terms for the customer that the online concierge system predicts will yield search results having relevance to the customer. The online concierge system executes respective search queries in a search engine of the online concierge system to generate respective search result sets for each of the respective search queries. Each of the respective search result sets comprise respective ranked lists of items relevant to the respective search queries. The online concierge system generates a user interface including selectable user interface elements for selecting one or more items in the ranked lists of items. The online concierge system receives, via the user interface, a selection of an item for adding to an order and facilitates procurement of the order and delivery of the order to the customer.

In one or more embodiments, obtaining the set of recommended search terms comprises identifying, based on the user identifier, an item previously purchased by the customer via the online concierge system; identifying, for the item, a plurality of converted search queries submitted from a population of customers of the online concierge platform that resulted in purchases of the item; identifying, from the plurality of converted search query, a top performing converted search query for the item; and including the top performing converted search query in the set of recommended search terms.

In one or more embodiments, obtaining the set of recommended search terms comprises obtaining, based on the user identifier, a historical set of search queries entered by the customer and obtaining the set of recommended search terms based at least in part on the historical set of search queries.

In one or more embodiments, obtaining the set of recommended search terms comprises obtaining a user embedding for the customer based a profile of the customer in the online concierge system, identifying search terms having search embeddings meeting similarity criteria with the user embedding, and obtaining the set of recommended search terms based at least in part on identified search terms.

In one or more embodiments, obtaining the set of recommended search terms comprises obtaining a set complementary search terms meeting a similarity metric with one or more historical search terms entered by the user in the online concierge system, and obtaining the set of recommended search terms based at least in part on the set of complementary search terms.

In one or more embodiments, obtaining the set of recommended search terms comprises obtaining an initial set of candidate search terms, performing a quality assessment of the initial set of candidate search terms, and selecting the set of recommended search terms from the initial set of candidate search terms that pass the quality assessment. Performing the quality assessment may comprise at least one of assessing historical conversion rates on the initial set of candidate search terms, assessing reorder probabilities of items returned in a search query using the initial set of candidate search terms, assessing a sensitivity level of a category of items relating to the initial set of candidate search terms, and assessing a time since a last order from a customer of items in the initial set of candidate search terms.

In one or more embodiments, the ranked lists of items are selected and ordered by applying a search ranking algorithm based on at least customer profile data characterizing the customer and promotion data associated with items.

In further embodiments, a non-transitory computer-readable storage medium stores instructions executable by a processor for carrying out any of the processes described herein. Furthermore, a computer system may include a process and a non-transitory computer-readable storage medium as described herein.

DETAILED DESCRIPTION

Figure 1:
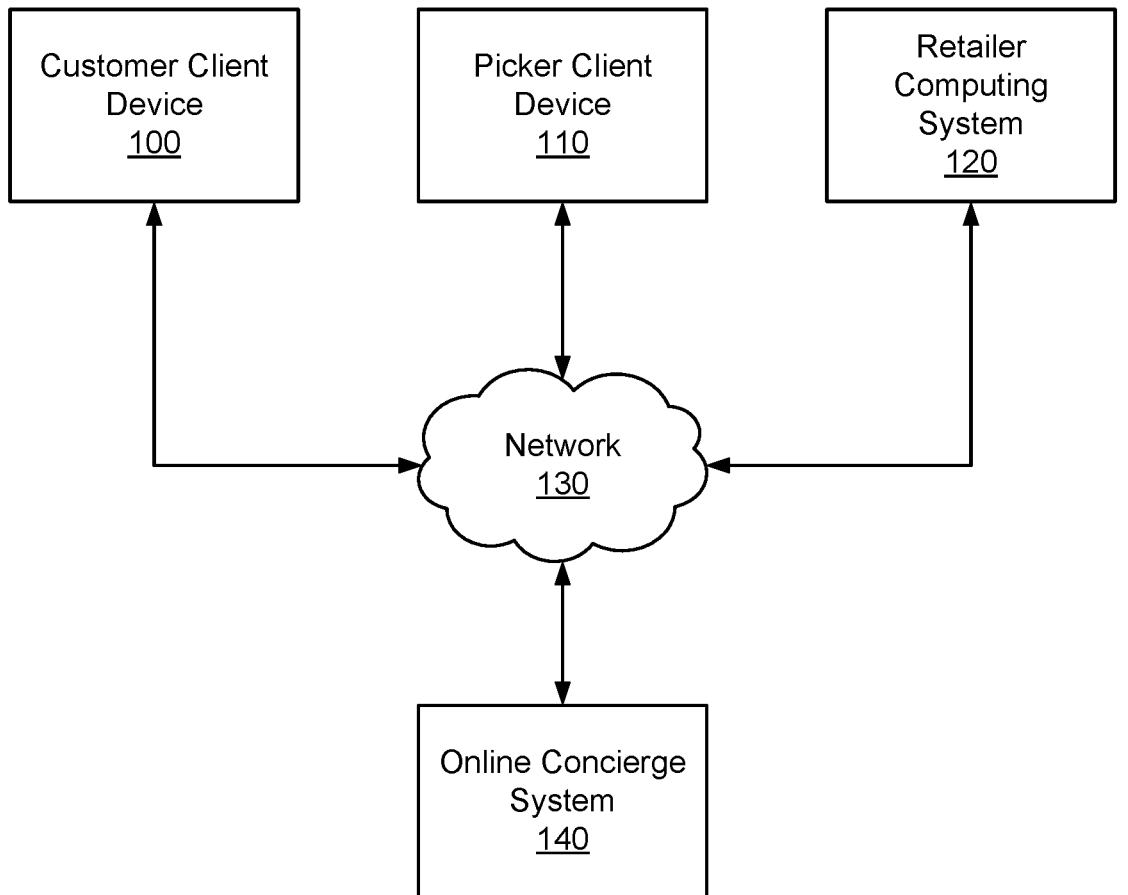
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
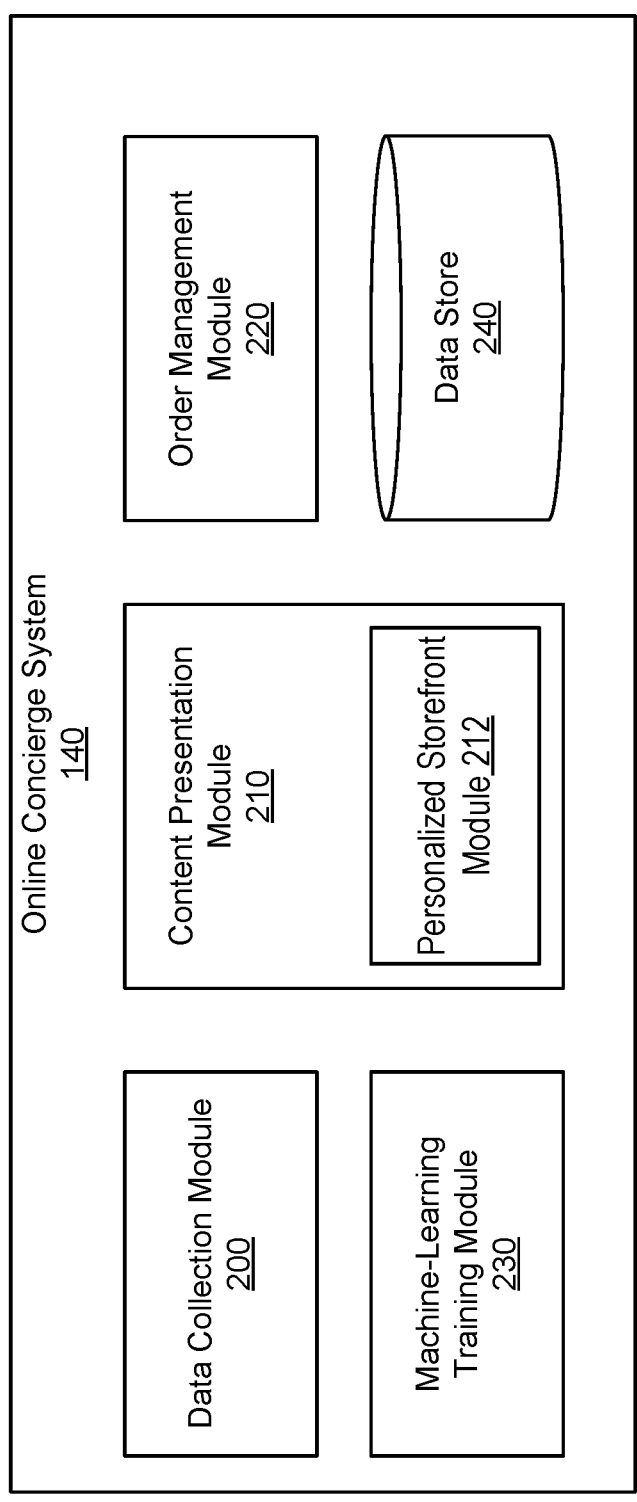
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240. For example, the content presentation module 210 may present one or more recommended repurchase items that the customer has purchased before and is likely to repurchase. These items may be identified and displayed without the user necessarily entering any explicit search query.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The content presentation module 210 may include a personalized storefront module 212 that generates a personalized storefront user interface to present to a customer. In one or more embodiments, this interface may be presented as a home screen when the user accesses the online concierge system 140 via the customer client device 100. In this view, the customer client device 100 may present multiple different sets of ranked search results that result from different input queries that the online concierge system 140 infers to be relevant to the customer. The selected search terms may be based on items the user previously purchased, historical search queries expressly entered by the customer, profile information of the customer, or other information. An example embodiment of a process for generating a personalized storefront user interface is described in further detail below with respect to FIG. 3 and an example embodiment of a personalized storefront user interface is described in further detail below with respect to FIG. 4.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
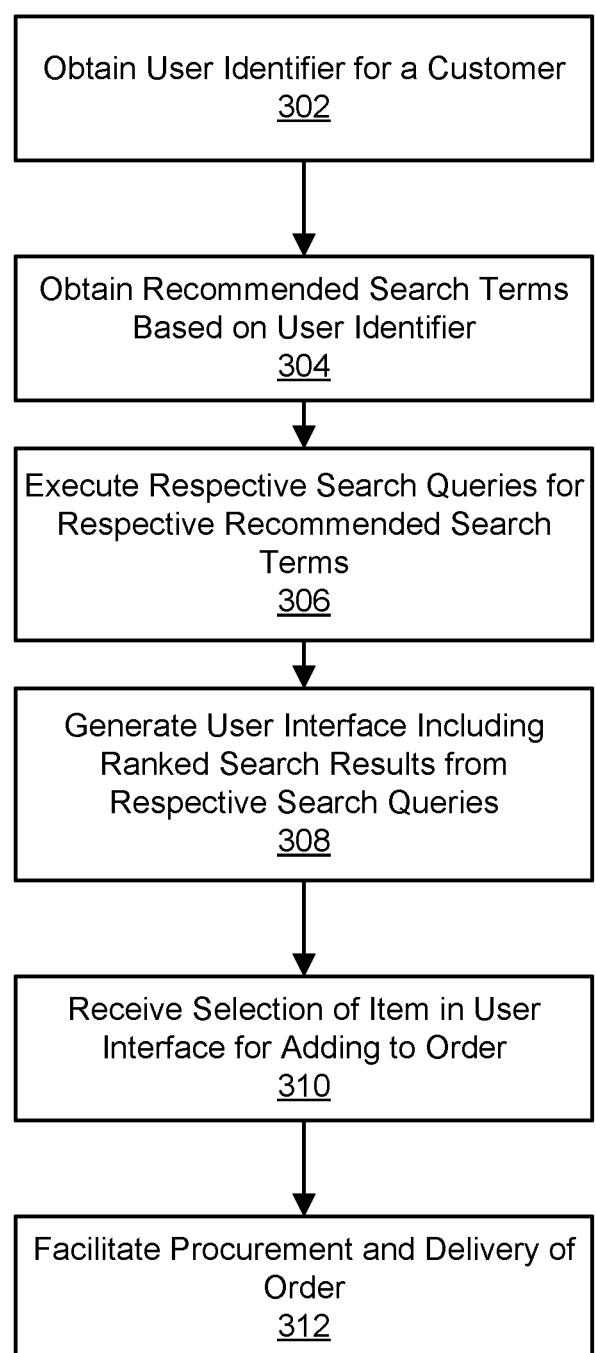
FIG. 3 is an example embodiment of a process for generating a personalized storefront user interface in an online concierge system.

FIG. 3 is a flowchart for a method of generating a personalized storefront user interface for a customer in a customer client device 100 associated with an online concierge system 140, in accordance with some embodiments. Alternative embodiments may include more, fewer, or different steps from those illustrated in FIG. 3, and the steps may be performed in a different order from that illustrated in FIG. 3. At least some of the steps may be performed automatically by the online concierge system 140 without human intervention.

The online concierge system 140 obtains 302 a user identifier for a customer of an online concierge system 140. The user identifier may be unique to the customer but does not necessarily include identifying information for the customer. For example, the user identifier may comprise an arbitrary string or numerical value associated with the customer.

The online concierge system 140 obtains 304 a set of recommended search terms based on the user identifier. The set of recommended search terms may comprise two or more different search strings that the online concierge system 140 predicts will yield search results relevant to the customer. The set of recommended search terms may be obtained using various techniques or a combination of techniques.

In one or more embodiments, the set of recommended search terms may be determined based at least in part on prior purchases of items by the customer (which may be stored to an order history database associated with the user identifier). Here, the online concierge system 140 may identify, based on the user identifier, one or more previously purchased items by the customer. The online concierge system 140 may then identify one or more converted search queries that were submitted from a population of customers of the online concierge system 140 that resulted in purchases of the item within that population of customers (e.g., all users of the online concierge system 140 or a subset of users having one or more characteristics in common with the customer). From the one or more converted search queries, the online concierge system 140 may identify one or more top performing converted search queries (i.e., search queries resulting in the most conversions) and include the one or more top performing search queries in the set of recommended search items. For example, the online concierge system 140 may identify that the customer previously purchased a particular brand of Indian Pale Ale. The online concierge system 140 may then determine that within a population of customers who purchased this brand of Indian Pale Ale, a significant number (e.g., above a threshold value) of them purchased the item after entering a search for "hoppy beer." The online concierge system 140 may include the expression, "hoppy beer" in the recommended search terms on this basis.

In one or more embodiments, the online concierge system 140 may identify recommended repurchase items in the manner described above and use these items to generate the recommended search terms. Thus, for example, the online concierge system 140 may first identify recommended items based on a likelihood of user repurchasing those items (which may be presented elsewhere in the user interface as recommended repurchase items), and then identify search terms (across a population of customers) associated with those items.

In one or more embodiments, the online concierge system 140 may furthermore obtain a historical set of search queries that have previously been entered by the customer (and may be stored to a database associated with the user identifier). One or more of the historical search queries may be used directly in the set of recommended search terms. The online concierge system 140 may select from the historical set of search queries based on factors such as frequency, recency, conversion rate associated with the search queries (i.e., how often the search queries directly resulted in a purchase), relevance to customer profile information associated with the customer, current timing information and timing data associated with the historical set of search queries, or other factors. In one or more embodiments, a machine learning model may be applied to rank historical search queries that are predicted to have the highest likelihoods of being relevant to the customer under current conditions.

In one or more embodiments, the online concierge system 140 may generate one or more novel search queries that are predicted to be relevant to the customer based on customer profile data. For example, the online concierge system 140 may obtain a user embedding for the customer that represents a profile of the customer and then identify search queries having sufficiently matching embeddings (e.g., achieve a threshold similarity). These novel search queries may include search terms that have not necessarily been manually entered by the customer in historical searches. The online concierge system 140 may then determine to include the predicted set of search queries in the set of recommended search terms for the customer.

In one or more embodiments, the online concierge system 140 may additionally obtain a set of complementary search terms that have embeddings meeting a similarity metric with the embeddings of one or more of the historical search terms or other recommended search terms identified using other techniques. For example, if the online concierge system 140 identifies "hot dogs" as a recommended search query using one of the techniques described herein, the online concierge system 140 may furthermore identify "hot dog buns" as a complementary search query. The online concierge system 140 may then include the complementary search terms in the set of recommended search terms.

In one or more embodiments, obtaining the set of recommended search terms may comprise first identifying an initial set of candidate search terms and then performing a quality assessment to identify search terms that pass the quality assessment. In an example of a quality assessment, the online concierge system 140 may assess historical conversion rates associated with the initial set of candidate search terms (how often the search query resulted in a purchase by the customer) and recommend only search terms that have at least a predefined historical conversion rate. In another example of a quality assessment, the online concierge system 140 may assess a reorder probability of categories of items associated with each of the candidate search terms (a likelihood of the customer ordering the item again) and recommend only search terms for item categories that are predicted to be reordered by the customer. In another example of a quality assessment, the online concierge system 140 may assess a sensitivity level of a category of items relating to the initial set of candidate search terms and remove search terms relating to categories that exceed a sensitivity threshold. For example, the online concierge system 140 may remove search terms associated with items such as pregnancy tests, weight loss items, or medications that may be deemed sensitive if expressly recommended. In another example of a quality assessment, the online concierge system 140 may assess expected reorder timing of categories of items (relative to the most recent order) associated with the initial candidate search terms and only recommend items in categories that meet certain timing criteria. For example, the online concierge system 140 may remove search terms for categories of items such as household cleaners or paper towels if they were ordered very recently by the customer or based on an analysis of the customer's typical reorder cycles.

In one or more embodiments, the quality assessment may be based on applying a machine learning model to the initial candidate set of search terms that infers a quality score based on historical search queries and their respective conversion rates. Such a machine learning may be trained based on customer-specific data and/or data from a population of customers.

After identifying the recommended set of search terms, the online concierge system 140 executes 306 respective search queries in a search engine using the respective search terms to generate respective search results sets. Each of the search result sets includes a respective ranked list of items relevant to the search query. The search result sets may be generated in part based on user-specific data such that the search results are personalized to the user. For example, a search engine may rank search results relating to the search terms based on determined affinities of the search results to user profile characteristics. In further embodiments, search results may be ranked based at least in part on promotion data associated with various items. For example, items that have been awarded promotion opportunities may receive a ranking boost that causes them to be ranked higher in the search results. Promotions may be awarded based on promotion auctions or based on other techniques.

The online concierge system 140 generates 308 a user interface including the ranked search results from the respective search queries. For example, each search may present the ranked search results as a set of selectable user interface elements for selecting corresponding items. The user interface elements may include, for example, an identifier for the item, a description of the item, an image of the item, or other identifying information. In one or more embodiments, each search result set is presented as a scrollable carousel that initially presents the top ranked results and includes a scroll control element to enable scrolling for viewing additional ranked search results. The scrollable carousels may furthermore be labeled based on the set of search terms from which they were derived. An example embodiment of a user interface displaying ranked search results is described with respect to FIG. 4.

The online concierge system 140 receives 310 a selection of an item in the user interface for adding to the order. Selecting a search result may cause the user interface to navigate to another page with more details about the item and a control for adding the item to an order. Alternatively, clicking the item in the carousel may directly add the item to the order. Upon completing the order, the online concierge system 140 may facilitate 312 procurement and delivery of the order to the customer as described above.

Figure 4:
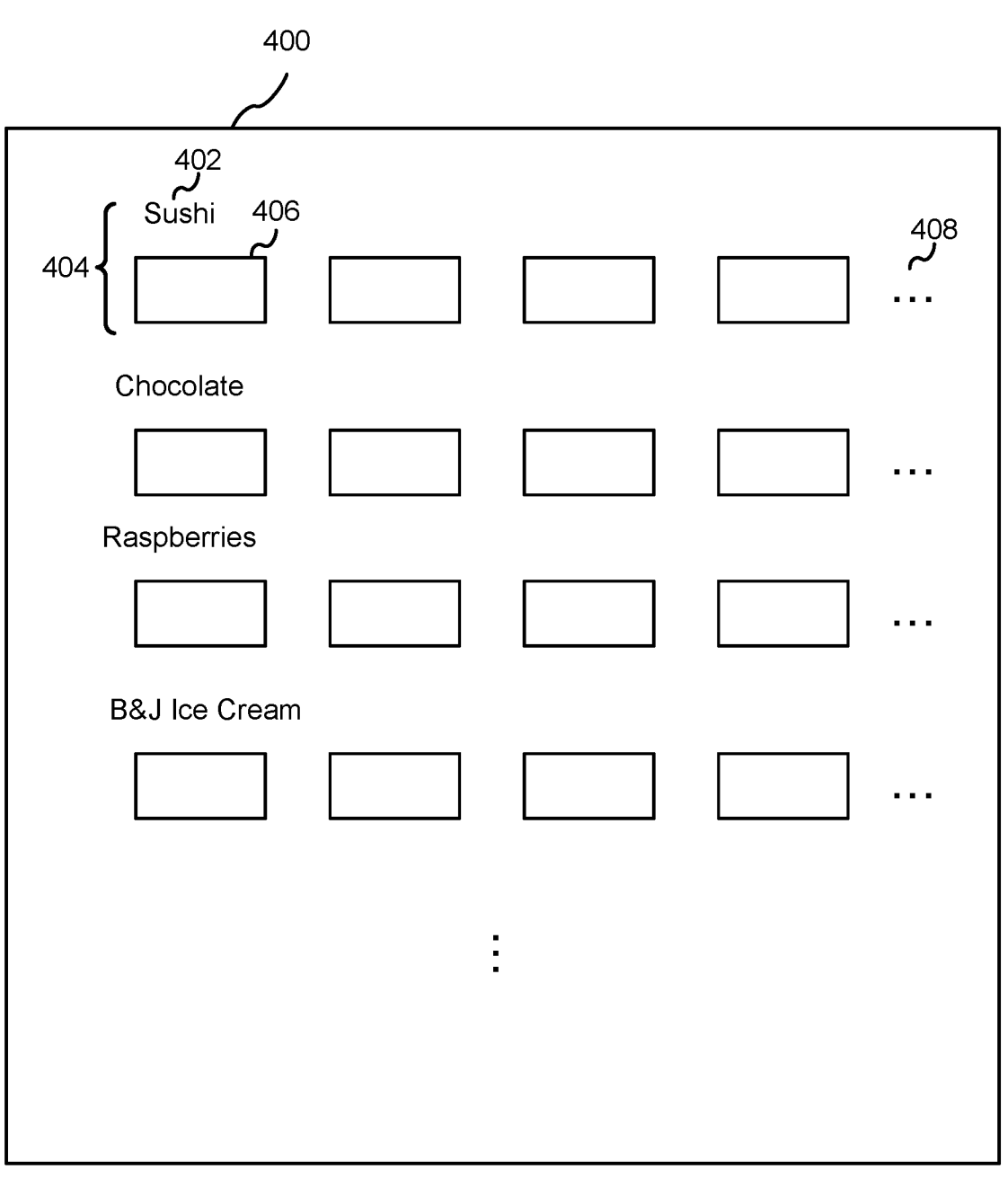
FIG. 4 is an example layout for a personalized storefront user interface in an online concierge system.

FIG. 4 illustrates an example embodiment of a personalized storefront user interface 400. The personalized storefront user interface 400 includes a set of carousels 404 that are associated with a search term 402 for a recommended search query. The carousels 404 each include a set of ranked search results 406 associated with the identified search term 402. The ranked search results 406 may include individual user interface elements including an image of the item and/or text describing the item. The results 406 may further comprise clickable links that when selected either navigate to a detail page for the item or directly add the item to a cart associated with an order. The carousels 404 may furthermore include a scroll control 408 that causes the carousel 404 to present additional search results associated with the search term 402.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:

receiving, over a network at a content presentation module of an online concierge system, a request for a home screen user interface from a client device associated with a customer of the online concierge system;

responsive to receiving the request, obtaining, by the content presentation module, a user identifier for the customer of the online concierge system;

based on the user identifier, obtaining, by the content presentation module, a set of recommended search terms for the customer that the online concierge system predicts will yield search results having relevance to the customer, wherein the set of search terms are obtained from a database storing recommended search terms in association with user identifiers;

executing, by the content presentation module, respective search queries in a search application of the online concierge system to generate respective search result sets for each of the respective search queries, each of the respective search result sets comprising respective ranked lists of items relevant to the respective search queries;

generating, by the content presentation module, a home screen user interface for the client device, the home screen user interface including selectable user interface elements for selecting one or more items in the ranked lists of items, wherein each selectable user interface element comprises a scrollable carousel of horizontally-arranged items within a corresponding ranked list of items, and wherein the selectable user interface element further comprises a scroll control element that causes the scrollable carousel to display additional items;

transmitting, by the content presentation module over the network, instructions to the client device to display the home screen user interface, wherein the instructions cause the client device to display a graphical user interface comprising the home screen user interface;

receiving, by the content presentation module over the network, a notification from the client device that the customer has interacted with the scroll control element of a scrollable carousel of a selectable user interface element of the home screen user interface;

identifying, by the content presentation module, a set of additional items relevant to a search query corresponding to the selectable user interface element associated with the scroll control element with which the user interacted;

transmitting, by the content presentation module over the network, instructions to the client device to update the home screen user interface to display the set of additional items;

receiving, by the content presentation module from the client device via the home screen user interface, a selection of an item of the set of additional items for adding to an order; and facilitating, by the online concierge system, procurement of the order and delivery of the order to the customer.

2. The method of claim 1, wherein obtaining the set of recommended search terms comprises:

identifying, based on the user identifier, an item previously purchased by the customer via the online concierge system;

identifying, for the item, a plurality of converted search queries submitted from a population of customers of the online concierge system that resulted in purchases of the item;

identifying, from the plurality of converted search query, a top performing converted search query for the item; and including the top performing converted search query in the set of recommended search terms.

3. The method of claim 1, wherein obtaining the set of recommended search terms comprises:

obtaining, based on the user identifier, a historical set of search queries entered by the customer; and obtaining the set of recommended search terms based at least in part on the historical set of search queries.

4. The method of claim 1, wherein obtaining the set of recommended search terms comprises:

obtaining a user embedding for the customer based a profile of the customer in the online concierge system;

identifying search terms having search embeddings meeting similarity criteria with the user embedding; and obtaining the set of recommended search terms based at least in part on identified search terms.

5. The method of claim 1, wherein obtaining the set of recommended search terms comprises:

obtaining a set complementary search terms meeting a similarity metric with one or more historical search terms entered by the customer in the online concierge system; and obtaining the set of recommended search terms based at least in part on the set of complementary search terms.

6. The method of claim 1, wherein obtaining the set of recommended search terms comprises:

obtaining an initial set of candidate search terms;

performing a quality assessment of the initial set of candidate search terms; and selecting the set of recommended search terms from the initial set of candidate search terms that pass the quality assessment.

7. The method of claim 6, wherein performing the quality assessment comprises at least one of:

assessing historical conversion rates on the initial set of candidate search terms;

assessing reorder probabilities of items returned in a search query using the initial set of candidate search terms;

assessing a sensitivity level of a category of items relating to the initial set of candidate search terms; and assessing a time since a last order from a customer of items in the initial set of candidate search terms.

8. The method of claim 1, wherein the ranked lists of items are selected and ordered by applying a search ranking algorithm based on at least customer profile data about the customer and based on promotion data about the items.

9. A non-transitory computer-readable storage medium storing instructions executable by a processor for performing steps comprising:

receiving, over a network at a content presentation module of an online concierge system, a request for a home screen user interface from a client device associated with a customer of the online concierge system;

responsive to receiving the request, obtaining, by the content presentation module, a user identifier for the customer of the online concierge system;

based on the user identifier, obtaining, by the content presentation module, a set of recommended search terms for the customer that the online concierge system predicts will yield search results having relevance to the customer, wherein the set of search terms are obtained from a database storing recommended search terms in association with user identifiers;

executing, by the content presentation module, respective search queries in a search application of the online concierge system to generate respective search result sets for each of the respective search queries, each of the respective search result sets comprising respective ranked lists of items relevant to the respective search queries;

generating, by the content presentation module, a home screen user interface for the client device, the home screen user interface including selectable user interface elements for selecting one or more items in the ranked lists of items, wherein each selectable user interface element comprises a scrollable carousel of horizontally-arranged items within a corresponding ranked list of items, and wherein the selectable user interface element further comprises a scroll control element that causes the scrollable carousel to display additional items;

transmitting, by the content presentation module over the network, instructions to the client device to display the home screen user interface, wherein the instructions cause the client device to display a graphical user interface comprising the home screen user interface;

receiving, by the content presentation module over the network, a notification from the client device that the customer has interacted with the scroll control element of a scrollable carousel of a selectable user interface element of the home screen user interface;

identifying, by the content presentation module, a set of additional items relevant to a search query corresponding to the selectable user interface element associated with the scroll control element with which the user interacted;

transmitting, by the content presentation module over the network, instructions to the client device to update the home screen user interface to display the set of additional items;

receiving, by the content presentation module from the client device via the home screen user interface, a selection of an item of the set of additional items for adding to an order; and facilitating, by the online concierge system, procurement of the order and delivery of the order to the customer.

10. The non-transitory computer-readable storage medium of claim 9, wherein obtaining the set of recommended search terms comprises:

identifying, based on the user identifier, an item previously purchased by the customer via the online concierge system;

identifying, for the item, a plurality of converted search queries submitted from a population of customers of the online concierge system that resulted in purchases of the item;

identifying, from the plurality of converted search query, a top performing converted search query for the item; and including the top performing converted search query in the set of recommended search terms.

11. The non-transitory computer-readable storage medium of claim 9, wherein obtaining the set of recommended search terms comprises:

obtaining, based on the user identifier, a historical set of search queries entered by the customer; and obtaining the set of recommended search terms based at least in part on the historical set of search queries.

12. The non-transitory computer-readable storage medium of claim 9, wherein obtaining the set of recommended search terms comprises:

obtaining a user embedding for the customer based a profile of the customer in the online concierge system;

identifying search terms having search embeddings meeting similarity criteria with the user embedding; and obtaining the set of recommended search terms based at least in part on identified search terms.

13. The non-transitory computer-readable storage medium of claim 9, wherein obtaining the set of recommended search terms comprises:

obtaining a set complementary search terms meeting a similarity metric with one or more historical search terms entered by the customer in the online concierge system; and obtaining the set of recommended search terms based at least in part on the set of complementary search terms.

14. The non-transitory computer-readable storage medium of claim 9, wherein obtaining the set of recommended search terms comprises:

obtaining an initial set of candidate search terms;

performing a quality assessment of the initial set of candidate search terms; and selecting the set of recommended search terms from the initial set of candidate search terms that pass the quality assessment.

15. The non-transitory computer-readable storage medium of claim 14, wherein performing the quality assessment comprises at least one of:

assessing historical conversion rates on the initial set of candidate search terms;

assessing reorder probabilities of items returned in a search query using the initial set of candidate search terms;

assessing a sensitivity level of a category of items relating to the initial set of candidate search terms; and assessing a time since a last order from a customer of items in the initial set of candidate search terms.

16. The non-transitory computer-readable storage medium of claim 9, wherein the ranked lists of items are selected and ordered by applying a search ranking algorithm based on at least customer profile data about the customer and based on promotion data about the items.

17. A computer system comprising:

a processor; and a non-transitory computer-readable storage medium storing instructions executable by the processor for performing steps comprising:

receiving, over a network at a content presentation module of an online concierge system, a request for a home screen user interface from a client device associated with a customer of the online concierge system;

responsive to receiving the request, obtaining, by the content presentation module, a user identifier for the customer of the online concierge system;

based on the user identifier, obtaining, by the content presentation module, a set of recommended search terms for the customer that the online concierge system predicts will yield search results having relevance to the customer, wherein the set of search terms are obtained from a database storing recommended search terms in association with user identifiers;

executing, by the content presentation module, respective search queries in a search application of the online concierge system to generate respective search result sets for each of the respective search queries, each of the respective search result sets comprising respective ranked lists of items relevant to the respective search queries;

generating, by the content presentation module, a home screen user interface for the client device, the home screen user interface including selectable user interface elements for selecting one or more items in the ranked lists of items, wherein each selectable user interface element comprises a scrollable carousel of horizontally-arranged items within a corresponding ranked list of items, and wherein the selectable user interface element further comprises a scroll control element that causes the scrollable carousel to display additional items;

transmitting, by the content presentation module over the network, instructions to the client device to display the home screen user interface, wherein the instructions cause the client device to display a graphical user interface comprising the home screen user interface;

receiving, by the content presentation module over the network, a notification from the client device that the customer has interacted with the scroll control element of a scrollable carousel of a selectable user interface element of the home screen user interface;

identifying, by the content presentation module, a set of additional items relevant to a search query corresponding to the selectable user interface element associated with the scroll control element with which the user interacted;

transmitting, by the content presentation module over the network, instructions to the client device to update the home screen user interface to display the set of additional items;

receiving, by the content presentation module from the client device via the home screen user interface, a selection of an item of the set of additional items for adding to an order; and facilitating, by the online concierge system, procurement of the order and delivery of the order to the customer.

18. The computer system of claim 17, wherein obtaining the set of recommended search terms comprises:

identifying, based on the user identifier, an item previously purchased by the customer via the online concierge system;

identifying, for the item, a plurality of converted search queries submitted from a population of customers of the online concierge system that resulted in purchases of the item;

identifying, from the plurality of converted search query, a top performing converted search query for the item; and including the top performing converted search query in the set of recommended search terms.

19. The computer system of claim 17, wherein obtaining the set of recommended search terms comprises:

obtaining, based on the user identifier, a historical set of search queries entered by the customer; and obtaining the set of recommended search terms based at least in part on the historical set of search queries.

20. The computer system of claim 17, wherein obtaining the set of recommended search terms comprises:

obtaining a user embedding for the customer based a profile of the customer in the online concierge system;

identifying search terms having search embeddings meeting similarity criteria with the user embedding; and obtaining the set of recommended search terms based at least in part on identified search terms.

* * * * *